United States Patent
Perez (10) Patent No.: US 9,889,512 B2
(45) Date of Patent: Feb. 13, 2018

(54) PERIPHERAL CLAMPING MINI-BLADE FOR A SUPERFICIAL ROUGHING DOWN AND MOUNTING ADAPTER DEVICE

(71) Applicant: Daniel Ricardo Perez, Provincia de Buenos Aires (AR)

(72) Inventor: Daniel Ricardo Perez, Provincia de Buenos Aires (AR)

( * ) Notice: Subject to any disclaimer, the term of this patent is extended or adjusted under 35 U.S.C. 154(b) by 124 days.

(21) Appl. No.: 14/589,536

(22) Filed: Jan. 5, 2015

(65) Prior Publication Data

US 2015/0190872 A1    Jul. 9, 2015

(30) Foreign Application Priority Data

Jan. 6, 2014   (AR) ................................ 20140100043

(51) Int. Cl.
*B23D 71/10* (2006.01)
*B23D 71/02* (2006.01)

(52) U.S. Cl.
CPC ........... *B23D 71/025* (2013.01); *B23D 71/10* (2013.01); *Y10T 407/181* (2015.01); *Y10T 407/28* (2015.01)

(58) Field of Classification Search
CPC ... B23D 71/025; B23D 71/10; Y10T 407/181; Y10T 407/28; Y10T 407/1815
See application file for complete search history.

(56) References Cited

U.S. PATENT DOCUMENTS

| 1,317,615 | A | * | 9/1919 | Cordell | B23D 71/025 407/29.12 |
|---|---|---|---|---|---|
| 2,240,559 | A | * | 5/1941 | Hawkinson | B23D 71/025 407/29.12 |
| 2,489,803 | A | * | 11/1949 | Neilsen | B23D 71/025 152/208 |
| 2,971,247 | A | * | 2/1961 | Cahill | B23D 71/025 407/29.12 |
| 3,528,153 | A | * | 9/1970 | Ernest | B23D 71/025 144/208.1 |
| 3,747,177 | A | * | 7/1973 | Jensen | B23D 71/00 407/29.12 |

(Continued)

*Primary Examiner* — Daniel Howell
*Assistant Examiner* — Nicole N Ramos
(74) *Attorney, Agent, or Firm* — Defillo & Associates, Inc.; Evelyn Defillo (57) ABSTRACT

The present invention refers to a mini-blade (1) which body (2) has an inner edge (4) in which there is, at least, one transversal tab (6) that constitutes a retention means of the mini-blade (1) in an adapter device (20); between the inner (4) and the external (3) edges, the body (2) has the sufficient extension to form clamping portions (7)(8) that allow the application of clamping peripheral tabs (30). The invention also refers to an adapter device (20) that, for the mounting of a rotary work structure (40) of pneumatic roughing down, includes clamping sets (20) composed of ending supports (21)(22) and intermediary separator supports (23), all of which have clamping transversal peripheral tabs (30) that form jaws capable of clamping the clamping positions (7)(8) of the mini-blade (1). The different supports (21)(22)(23) that form the clamping sets (20) are arranged attached one to another, in train, with the mini-blades (1) interspersed in their jaws, in such a way that the toothed external edge (3) of these last ones protrudes from the clamping set (20).

6 Claims, 14 Drawing Sheets (56) References Cited

U.S. PATENT DOCUMENTS

| | | | | |
|---|---|---|---|---|
| 3,879,825 A | * | 4/1975 | Jensen | B23D 71/02 29/90.01 |
| 5,206,977 A | * | 5/1993 | Larin | B23D 61/023 407/29.12 |
| 2004/0234347 A1 | * | 11/2004 | Collins | B23D 71/025 407/29.12 |
| 2007/0286690 A1 | * | 12/2007 | Perez | B23D 71/005 407/29.12 |

* cited by examiner

PERIPHERAL CLAMPING MINI-BLADE FOR A SUPERFICIAL ROUGHING DOWN AND MOUNTING ADAPTER DEVICE

FIELD OF THE INVENTION

The present invention pertains to the field of several industrial techniques that refer to the work in plastic substances, in particular to the retreading of pneumatics.

In particular, it refers to a peripheral clamping mini-blade for a superficial roughing down which body is extremely reduced, since only a minimum part is directed to the clamping thanks to a short tab that allows its mounting in the adjacencies to the periphery of rotary structures through adapter devices.

The invention also refers to a mounting adapter device which clamping sets allow a firmly clamping to the roughing down mini-blades through different peripheral tabs, without the need to pass through its body.

PRIOR ART

It is well-known that the retreading is a process through which a worn-out pneumatic is renewed by giving it a new wheel thread.

The presence of strange bodies, such as nails, screws, strange metallic bodies or embedded glasses, tend to produce couplings with the teeth of the blades. These couplings use to give rise to tensions and shock loads.

Precisely, in order to ensure the mounting of the blades and to bear these efforts, the known devices use blades that are skewered.

On the other hand, blades are tools made from steel and that have a thermic tempered and quenched treatment in all their bodies. However, only a minimum part is used for the scraping work. The main part of the body of the blade is directed to the mounting in the device carrying out the clamping. Therefore, there is a great waste of material.

All above has economic and also environmental implications, since 5,000 Kw/h of electric power are needed to produce 1 Tn of steel. For each ton of steel block manufactured, 145 kg of slag, 23 kg of granulated slag, approximately 150,000 liters of waste water and around 2 Tn of gas emissions are generated (including $CO_2$, sulphurous oxides and nitrogen oxides).

Further developments, such as those made by the same inventor of this application, allowed the obtainment of blades which body could be mounted without counting the bolts, such as can be appreciated in patent documents AR20070101674, AR20070101675 and AR20080105424.

However, up to now the main part of the body of the blades is directed to its mounting and clamping in the different devices used to that effect.

On the other hand, blades are processed with "raw" materials (malleable non-tempered steel). Once they are shaped, a thermic treatment is conducted granting them the necessary hardness to be able to work. During this treatment (heating at 800° C. and further cooling at 120° C.) a deformation that removes the blade from the plane is produced. This deformation is produced in all thermic treatments, but results despicable when the steel pieces have a great thickness.

In the case of conventional roughing down blades, the presence of different openings and holes increases the deformation possibilities that makes its assemble in the clamping set difficult or impossible.

It is possible to template lengthen pieces with little thickness, but they have to be mounted in special devices and introduce these devices in the ovens. In this case the oven has to heat much more quantity of the material and many operations, such as the placement and dissemblance of the blades in the devices, have to be developed, which produces an increase in costs and turns the blade so treated into a very expensive and commercially uncompetitive piece.

Advantages and Purposes

A purpose of this mini-blade is to provide a mini-blade of an extremely reduced size in which, for the first time, the clamping part is smaller than the working part.

An advantage is that its clamping part does not need any slot, hole or opening to be mounted in the clamping set.

A reduction of the size in relation to the conventional blades, allows saving, at least, 30% in the steel used. That is the case regarding the prior blades of the same inventor. But such saving is much bigger regarding the conventional blades which size is bigger.

All above implies an important energy saving during the thermic treatment. The absence of fixing openings prevents weakening in the clamping part of the mini-blade which, at the same time, prevents breakage of the blades when hits owed to pulls because of the presence of impurities embedded in the coatings to rough down are produced.

Another advantage is that a uniform clamping is reached thanks to the presence of a transversal tab and its adjacent clamping portions, which allows it to adequately support both the centripetal forces and the centrifugal forces that operate uniformly over all the laminar body (free from weakening due to openings).

The presence of the transversal tab, not only allows a sure and uniform clamping, but also has a structural function that prevents deformations of the laminar body.

Another advantage of the transversal tab is that it grants to the piece a stronger structure so that, during the thermic treatment, it is nor distorted regarding its plane, at the same time its body is reinforced and, also, prevents clamping slits that can structurally weaken the piece.

Another advantage is that present mini-blade weighs three or more times less than conventional ones.

For its part, the clamping set grants supports which jaws are formed by some peripheral transversal tabs that clamps in a retentive manner the transversal tabs of the blades, at the same time they apply a uniform and uninterrupted clamping throughout the laminar body.

Another advantage is that the supports of the clamping sets grant positional guides formed by some peripheral sockets, wherein the tabs of the mini-blades are placed.

Another advantage of the clamping set is its modular capacity. This is possible because it is based on a system of two end supports and one intermediary separator support. Therefore, sets can be adapted to any necessity incorporating the amount of intermediary separator supports needed.

Another advantage is the adaptation capacity of the clamping set to different rotary work structures, and consequently it does not need complex, very specific or equipped with special mounting systems structures.

DESCRIPTION OF THE DRAWINGS

For better clarity and understanding of the object of the invention, it is illustrated with several figures where it has been represented in one of its preferred embodiments, everything as an illustrative example, without limitation.

In the different figures, the same numbers and/or reference letters indicate equal or corresponding parts.

LIST OF THE MAIN REFERENCES

Figure 1A:
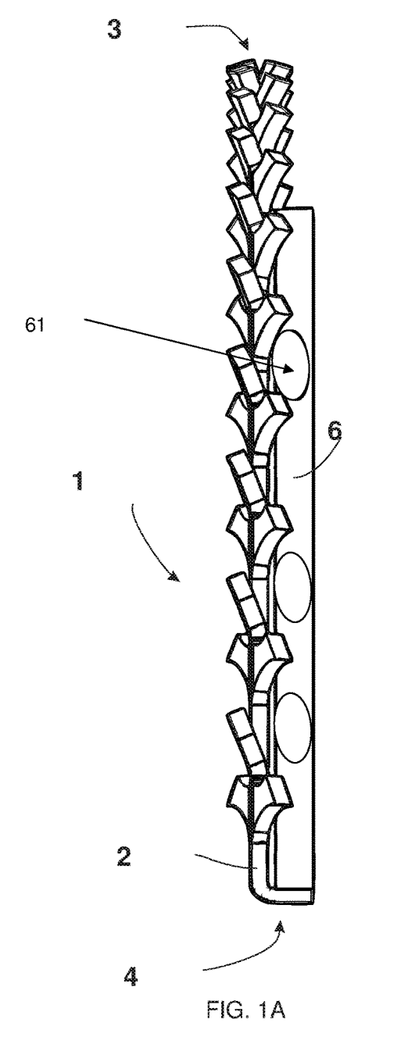
FIG. 1A, shows a side elevation view of the present mini-blade in which the projection of the transversal tab, regarding its body, can be observed.
Figure 1B:
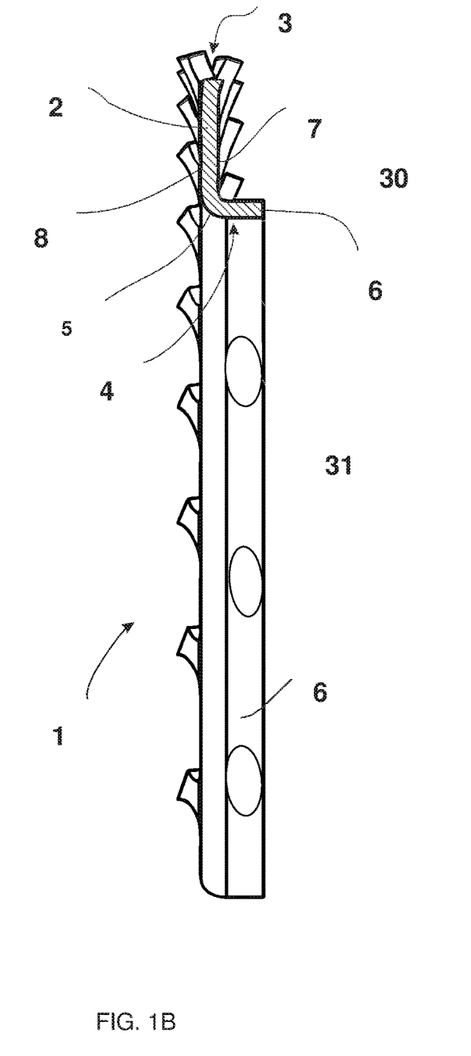
FIG. 1B, shows a transversal cut, according to a plane that appears indicated as III-III in FIG. 2B.
Figure 2A:
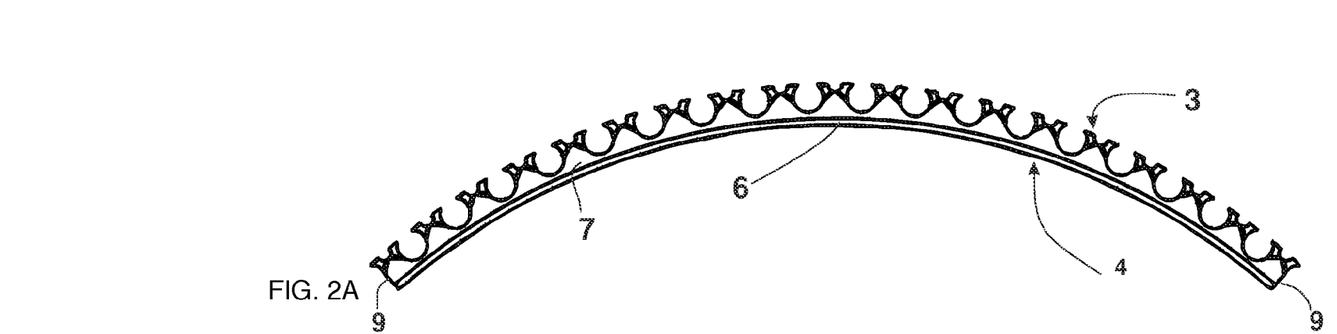
FIG. 2A, shows a front elevation view of the present mini-blade in which inner edge we can see the transversal tab.
Figure 2B:
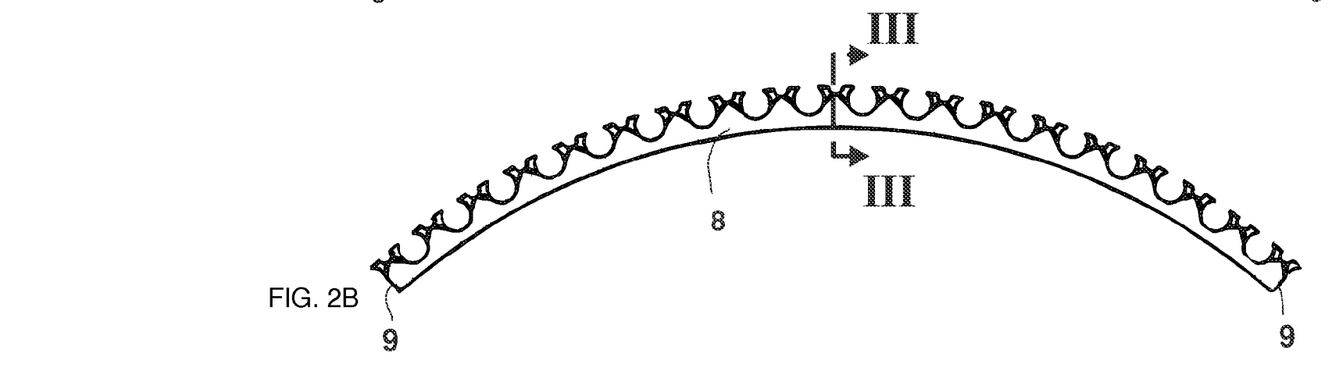
FIG. 2B, shows a rear elevation view of the present mini-blade.
Figure 2C:
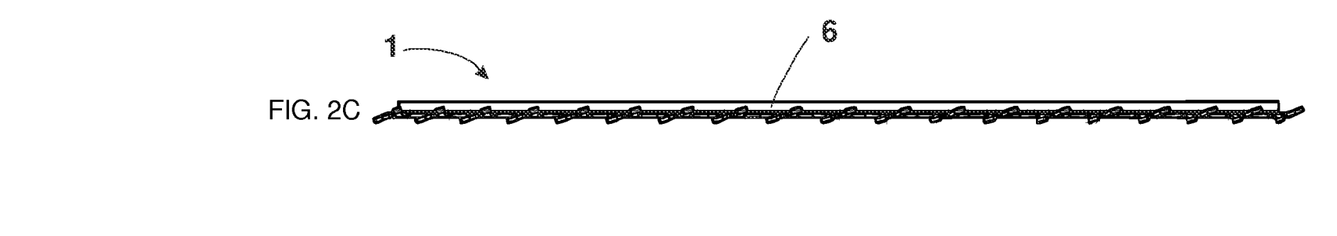
FIG. 2C, shows an upper plan view, of the present mini-blade.
Figure 3A:
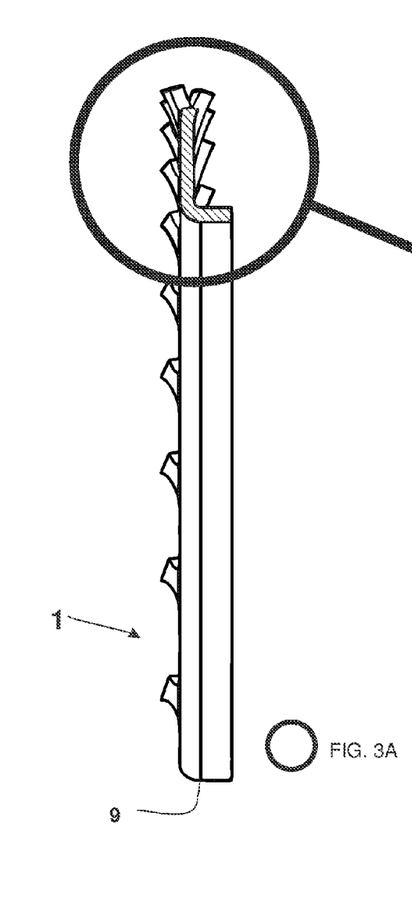
FIG. 3A, shows a transversal cut, according to a plane that appears indicated as III-III in FIG. 2B, and FIG. 3B, shows a detailed view of the transversal cut of FIG. 3A that allows the detailed appreciation of the constitution of the mini-blade.
Figure 3B:
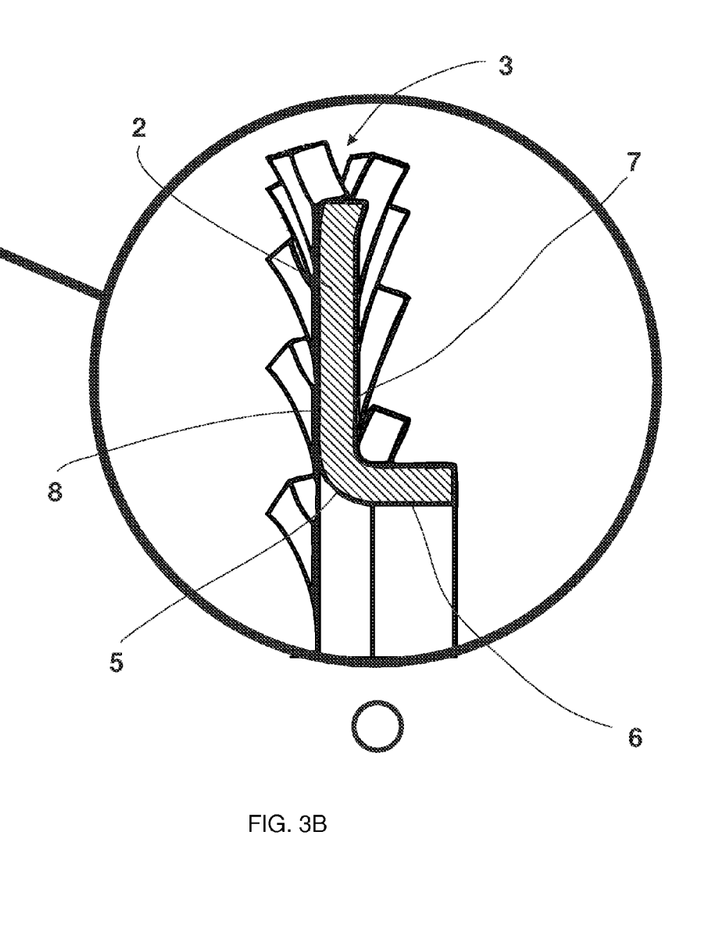
Figure 4:
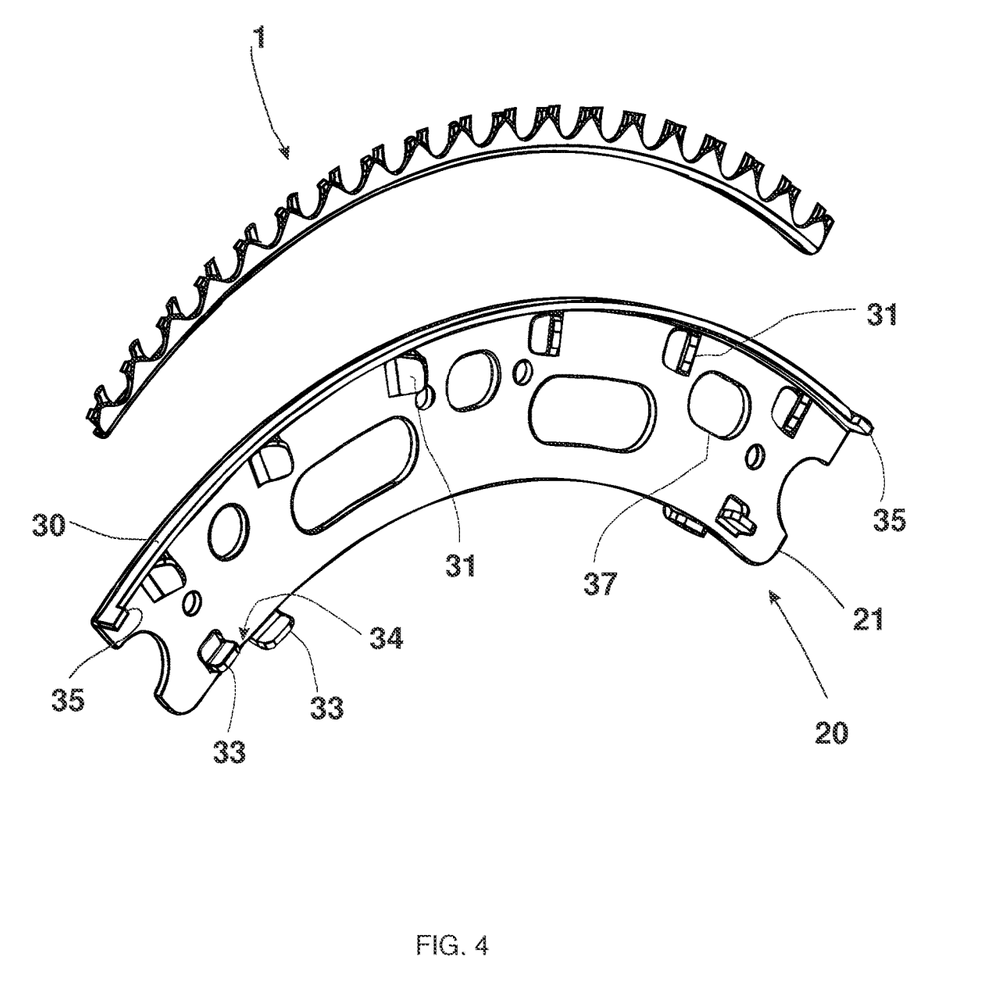
FIG. 4 shows a perspective expanded view of a support and a mini-blade.
Figure 5A:
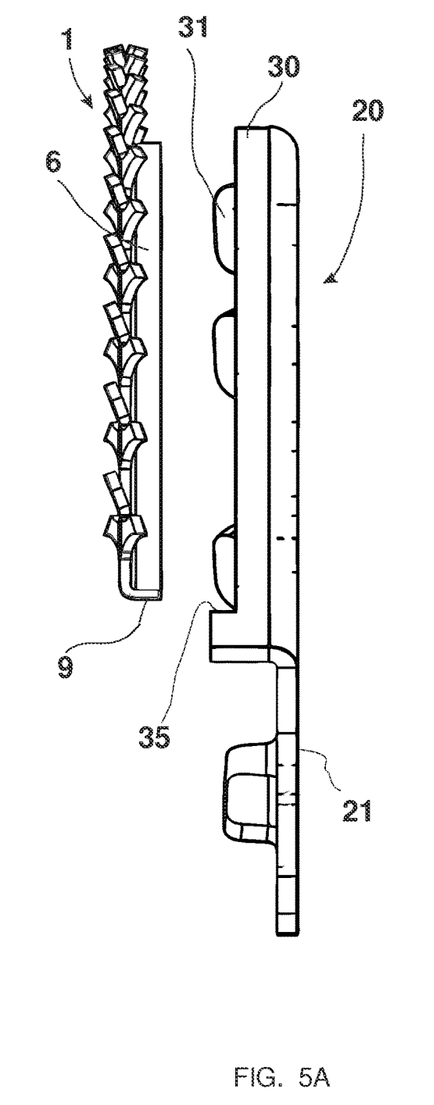
FIG. 5A, shows a side elevation view of a blade and a support.
Figure 5B:
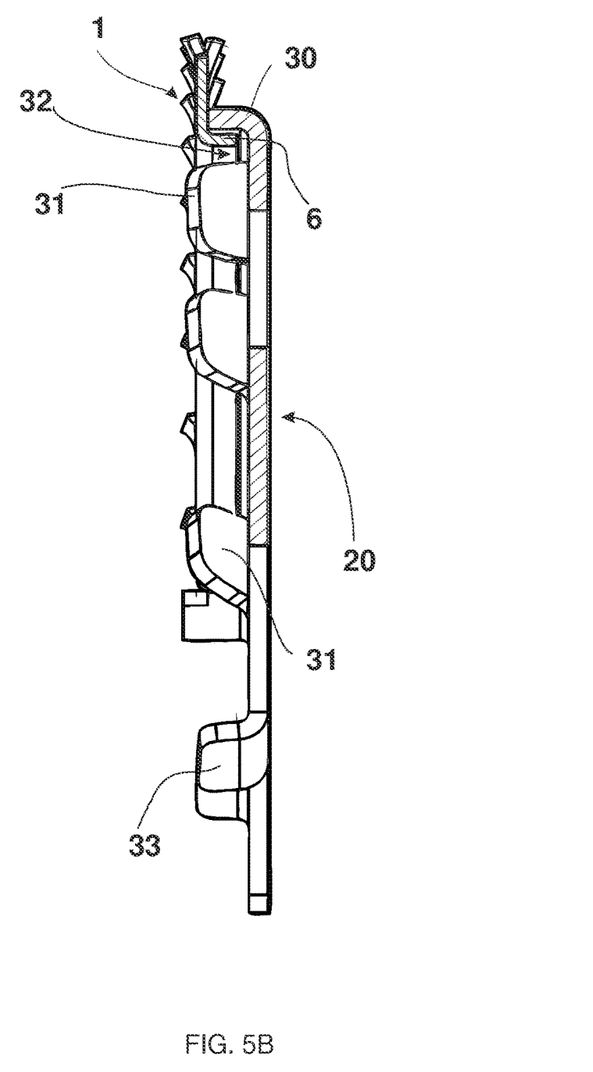
FIG. 5B, shows a transversal cut, according to a plane that appears indicated as VB-VB in FIG. 6, of a mounted blade and support.
Figure 6A:
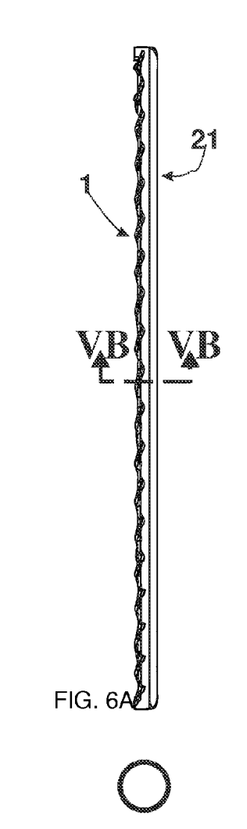
FIG. 6A, shows an upper plan view of the present mini-blade mounted on a support.
Figures 6B, 6C:
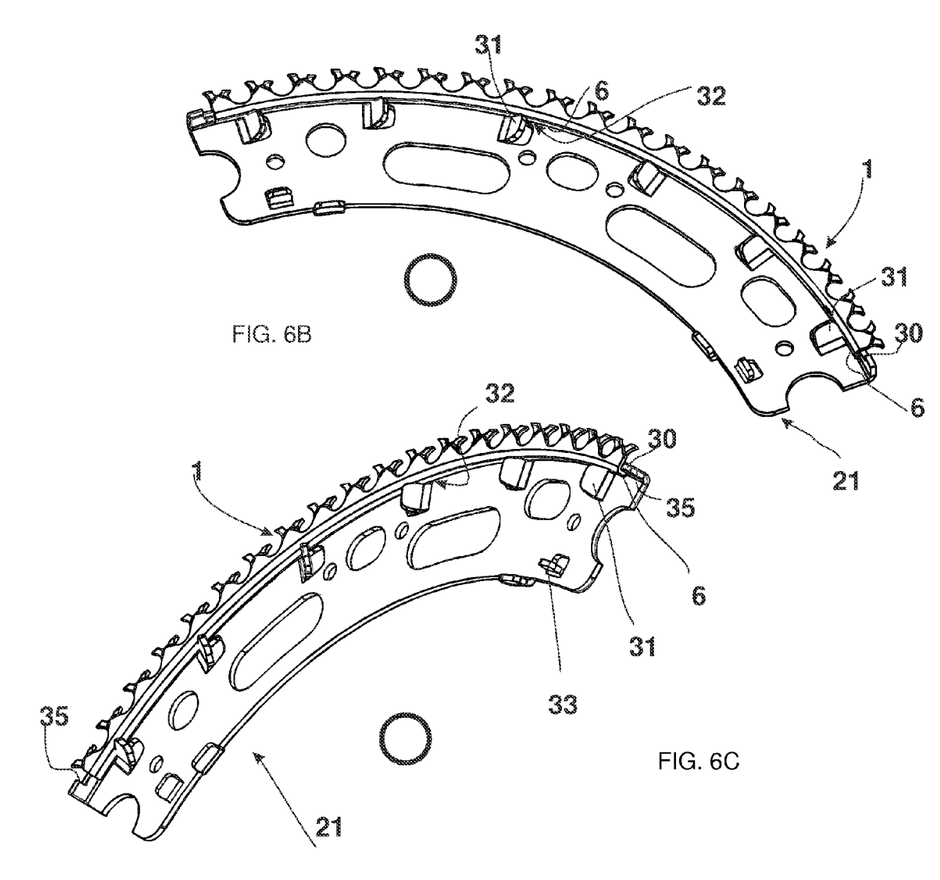
FIG. 6B, shows a perspective view of the set of FIG. 6A.
FIG. 6C, shows another perspective view of the set of FIG. 6A.
Figures 7A, 7B:
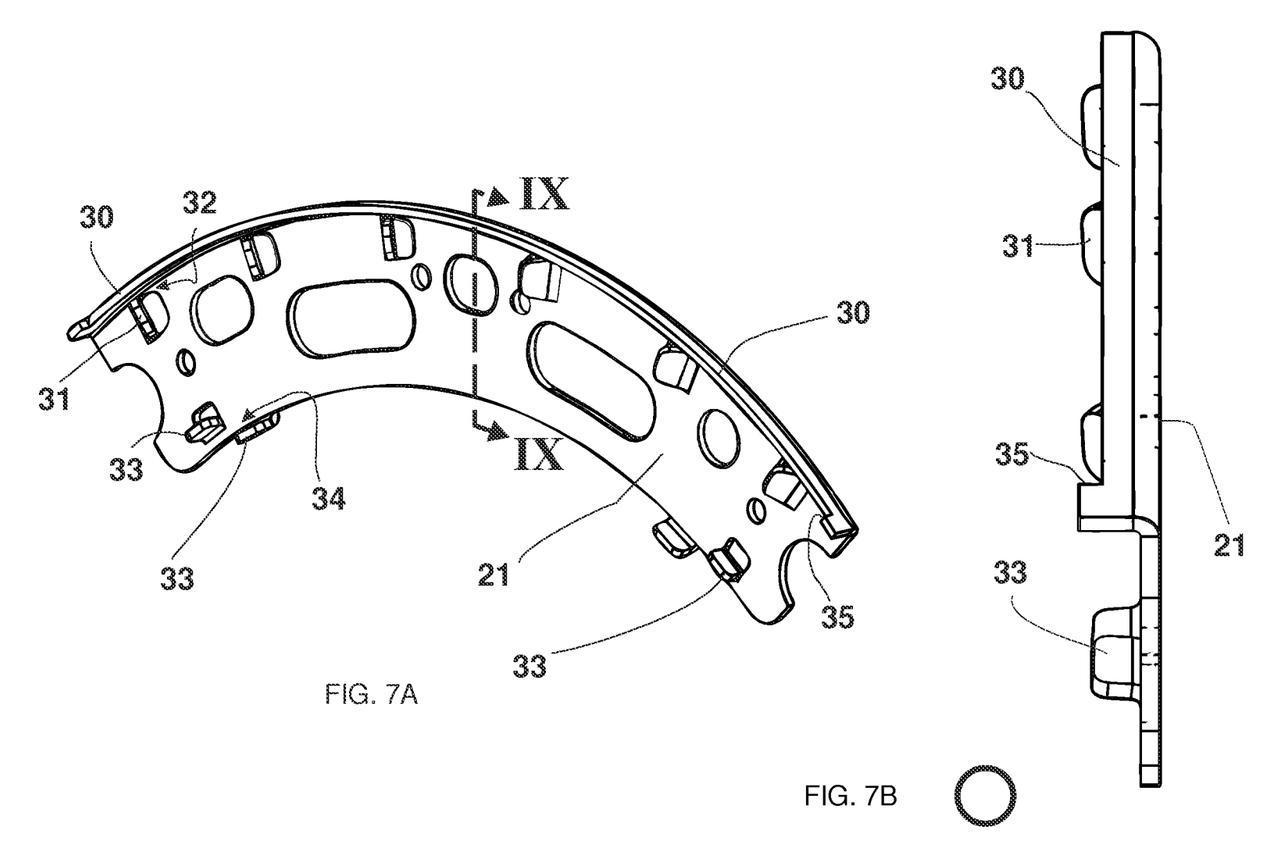
FIG. 7A, shows a perspective view of a first support.
FIG. 7B, shows a side elevation view of the support of FIG. 6A.
Figure 8A:
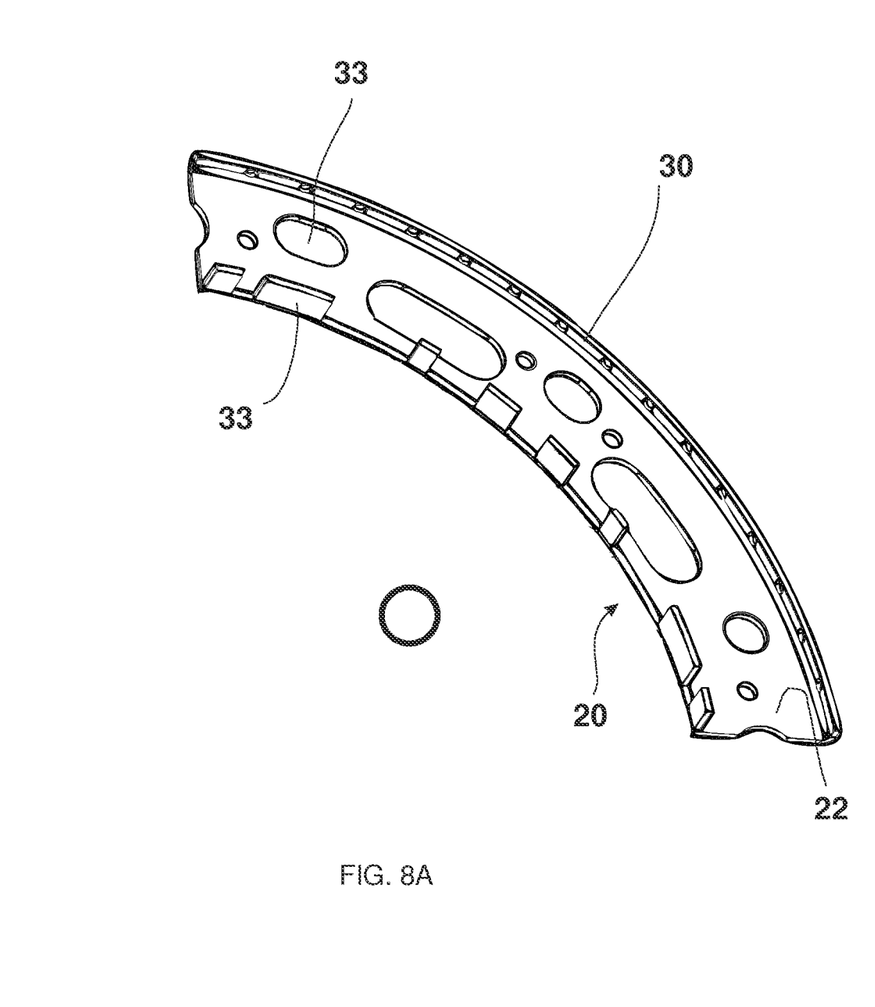
FIG. 8A, shows a perspective view of a second support.
Figure 8B:
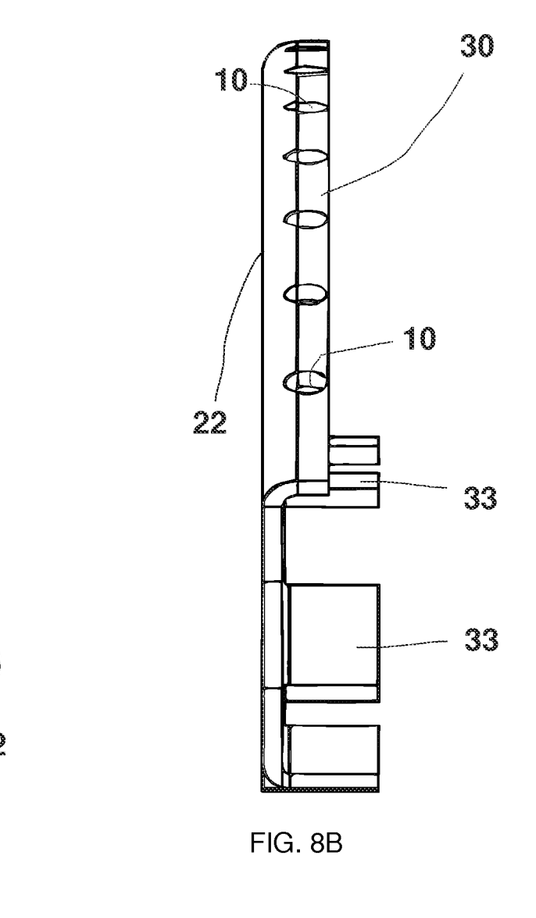
FIG. 8B, shows a side elevation view of the support of FIG. 8A.
Figure 9A:
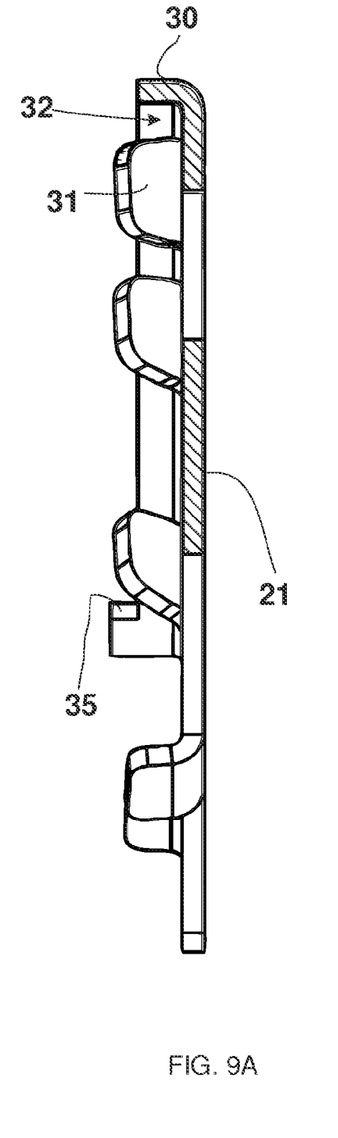
FIG. 9A, shows a transversal cut, according to a plane that appears indicated as IX-IX in FIG. 7A, of a first support provided with protruding ears as guide members, for the transversal tab of the mini-blade
Figure 9B:
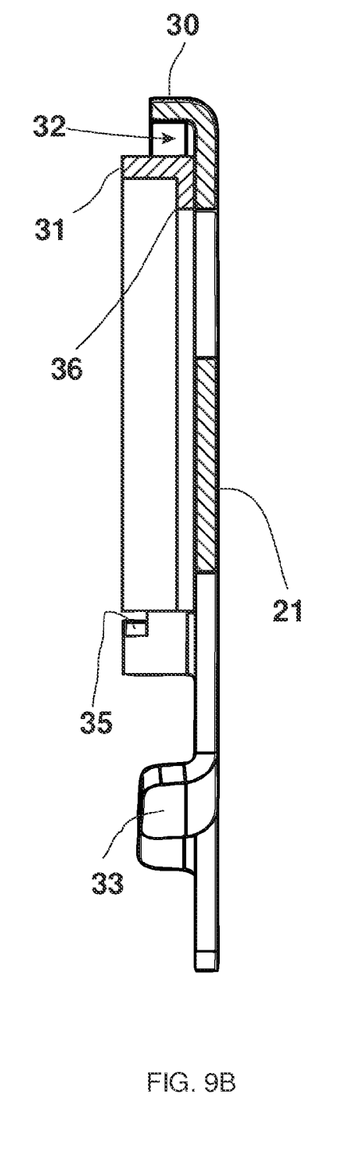
FIG. 9B, shows a transversal cut of a first support provided with a protruding tab as guide member, for the transversal tab of the mini-blade.
Figures 10A, 10B:
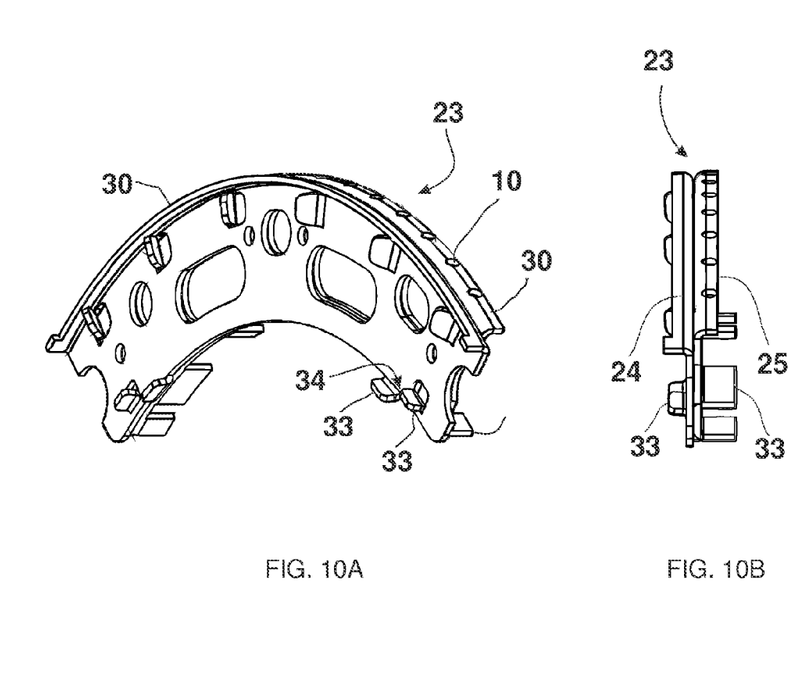
FIG. 10A, shows a perspective right view of an intermediary separator support.
FIG. 10B, shows a side elevation view of a intermediary separator support of FIG. 10A and FIG. 10C, shows a perspective left view of an intermediary separator support of FIG. 10A.
Figure 10C:
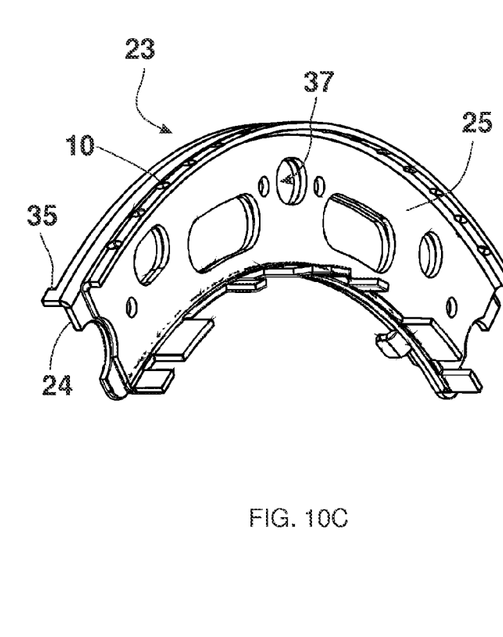
Figure 11:
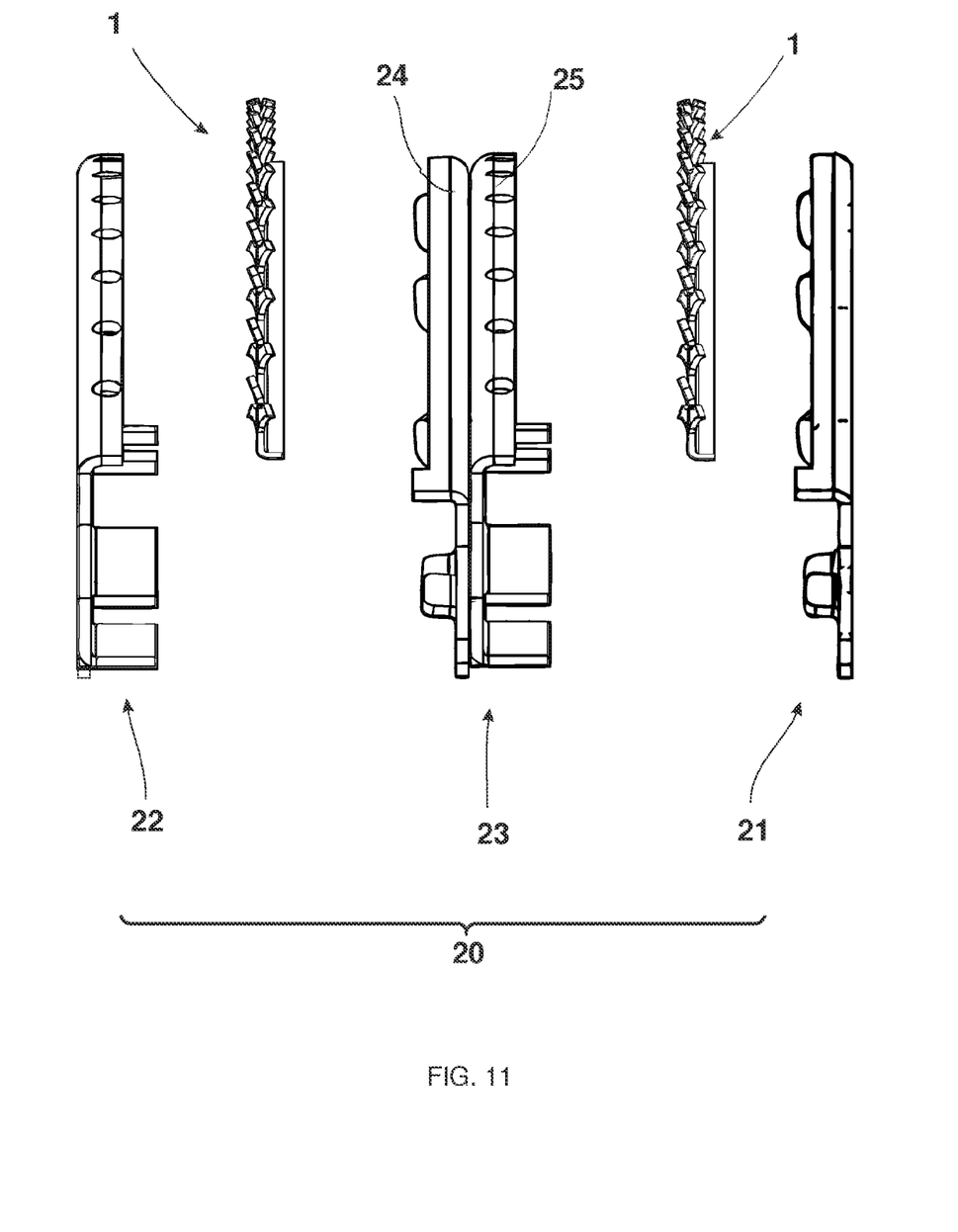
FIG. 11 shows a side elevation view of a basic expanded clamping set: first ending support, intermediary separator support and second ending support and the corresponding mini-blades.
Figure 12:
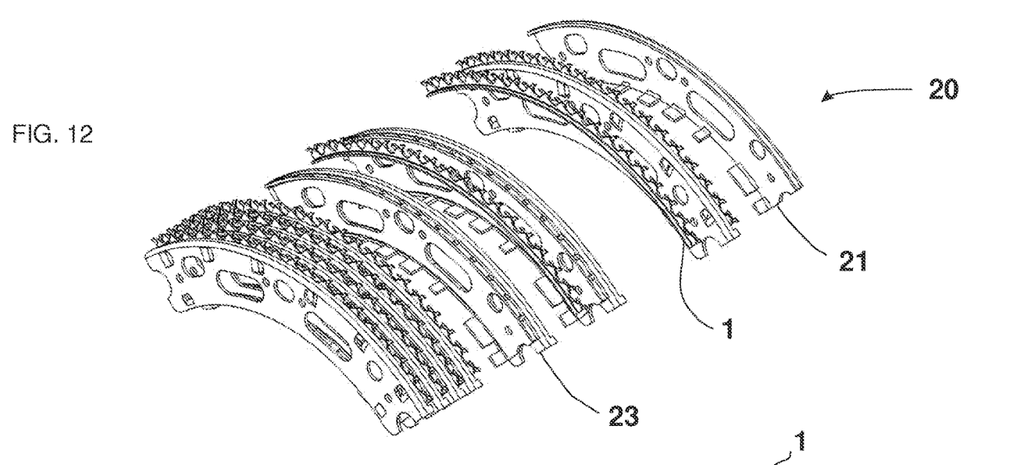
FIG. 12 shows an expanded perspective view that allows the appreciation of present mini-blade in relation to the different integral parts of the clamping set of the adapter device.
Figure 13:
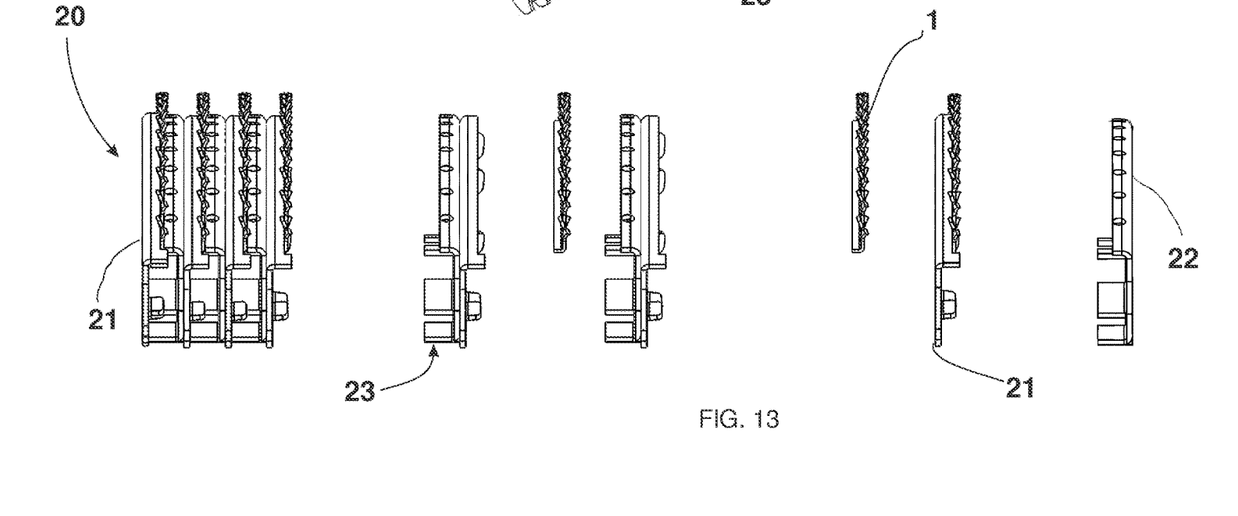
FIG. 13 shows a side elevation view of a clamping set and mini-blades, which appears partially assembled in the left part of the drawing.
Figure 14:
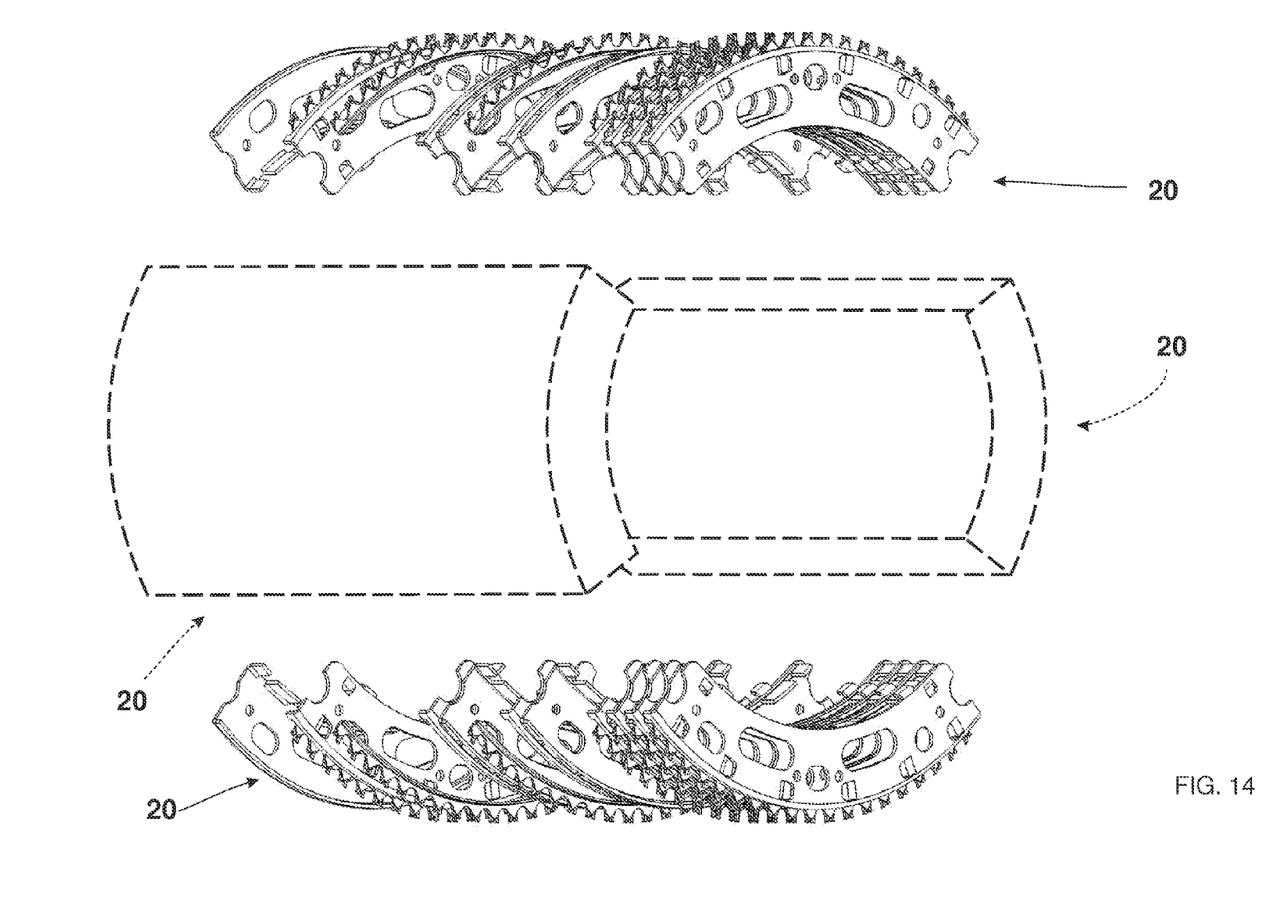
FIG. 14 shows a perspective view of the two clamping sets, assembled in part, with the corresponding mini-blades.
Figure 15:
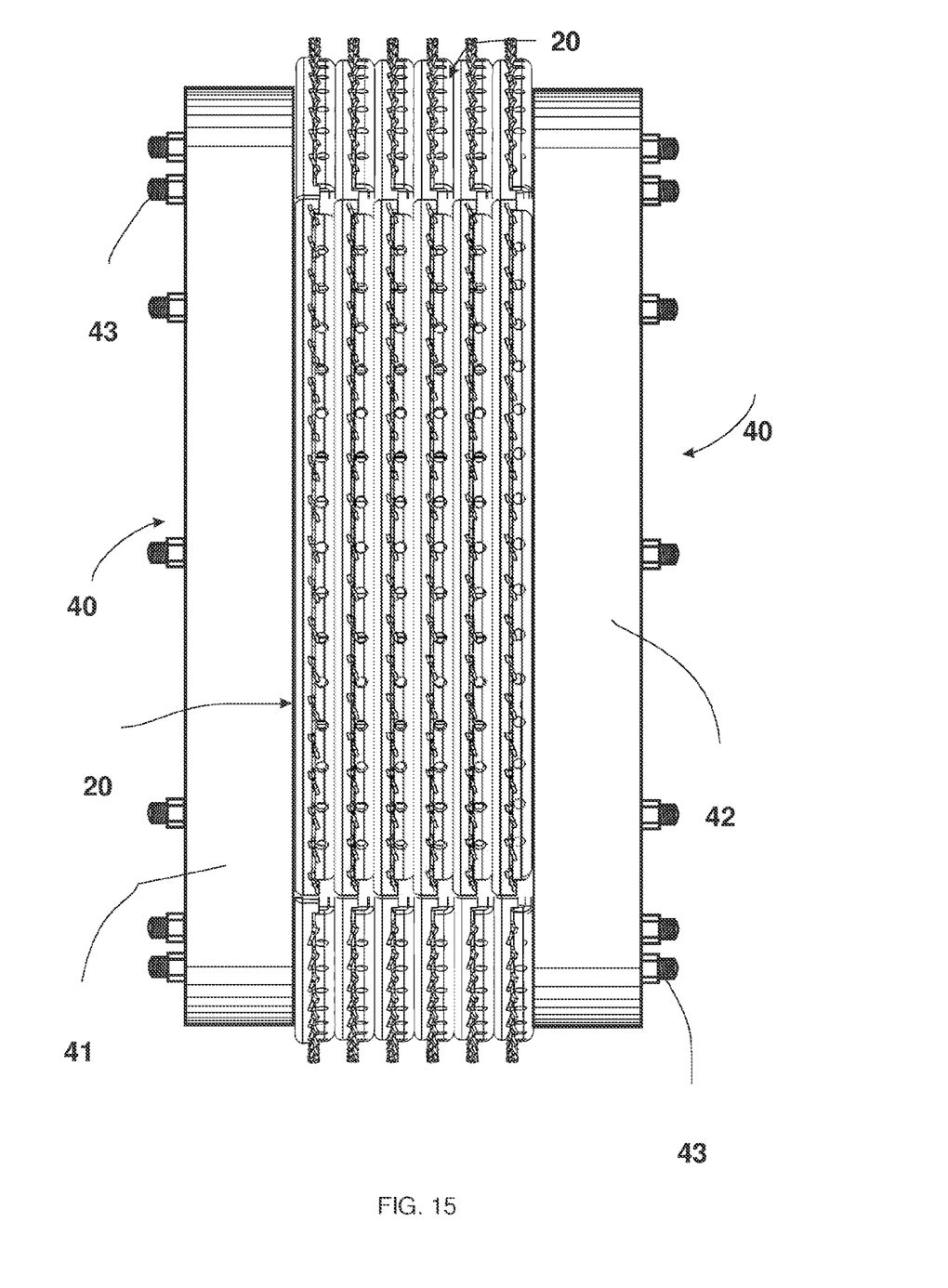
FIG. 15 shows a side elevation view of several clamping sets with their corresponding mini-blades, mounted among the bodies of a rotary work structure.

1) Mini-blade.
(2) Main laminar body.
(3) Toothed external edge.
(4) Inner edge.
(5) Fold or bend.
(6) Transversal tab.
(7) Inner clamping portion.
(8) External clamping portion.
(9) Endings.
(10) Reliever means [of temperature and waste].
(11) Peripheral openings [reliever means (10)].
(12) Body openings [reliever means (10)].
(20) Clamping set [adapter device].
(21) First ending support.
(22) Second ending support.
(23) Intermediary separator support.
(24) First component body [includes the intermediary separator support (23)].
(25) Second component body [includes the intermediary separator support (23)].
(30) Transversal peripheral tab [clamping jaw]. 31) Guide members [ears, inner tabs, etc.]
(32) Positional guide [peripheral socket].
(33) Set positioning members (20) (34) Mounting guide.
(35) Ending tops [for the containment of the endings (9)].
(36) Detachment [to provide guide members (31)].
(37) Mounting openings.
(40) Rotary work structure.
(41) First mounting body [component of the structure (40)].
(42) Second mounting body [component of the structure (40)].
(43) Bolts of the structure (40) [screws, threaded rods, etc.]
(60) Openings for the compensation of transversal tabs (6).

DESCRIPTION OF THE INVENTION

In general terms, the present invention refers to a peripheral clamping mini-blade for a superficial roughing down which body (2) has an inner edge (4) in which there is at least one transversal tab (6) that constitutes a retention means of the mini-blade (1) in an adapter device (20); between the inner (4) and external (3) edges, the body (2) has the sufficient extension to form the clamping portions (7) (8) that allow the application of peripheral clamping tabs (30). The invention also refers to a mounting adapter device that, for the mounting in a rotary work structure (40) of pneumatics roughing down, includes clamping sets (20) composed of ending supports (21) (22) and intermediary separator supports (23), all of which have clamping transversal peripheral tabs (30) that include jaws able to clamp the clamping portions (7)(8) of the mini-blades (1).

DETAILED DESCRIPTION OF THE INVENTION

More particularly, present mini-blade (1) includes a laminar body (2) or toothed blade, through which the superficial roughing down of the wheel thread of the pneumatics that will thereafter be retreated.

Even more particularly, the mini-blade (1) includes a laminar body (2) or blades of low height and curved edges. One of those convex curved edges is a toothed edge (3), for instance, having double teeth capable of working to opposite sides and which conformation allows them to auto-sharpen, at the same time they work.

The toothed edge (3) extends until the endings (9) in which the laminar body (2) of the mini-blade (1) terminates.

Opposite to above-mentioned toothed edge (3), the laminar body (2) ends in a concave inner edge (4). In said inner edge (4) there is a fold (5) or bend, through which the transversal tab (6) is projected.

This transversal tab (6) constitutes a retention means for an adaptater device (20) that allows the mounting in a rotary work structure (40).

Above-mentioned tab (6) is transversal with respect to the laminar body (2) from which it is projected. To fulfill its function property, preferably, this tab (6) may be perpendicular regarding the laminar body (2) or also form an angle not bigger than 90°.

Even if it is foreseen that the extension or height of the laminar body (2), between the external (3) and inner (4) edges, be as short as possible. It will be enough if it has the sufficient extension such as to be able to apply the corresponding peripheral clamping transversal tabs (30) to a clamping set (20) of an adapter device.

In such a way, the mini-blade (1) includes a clamping part, that includes the transversal tab (6) and some clamping portions (7)(8) adjacent to the body (2). The rest of the body (2) and the external toothed edge (3), constitute a part of the work that is applied to the work of superficial roughing down.

The possibility of incorporating openings of compensation (61) in the transversal tab (6) that, for instance, allow compensation of eventual distortions of the laminar body (2) has been foreseen.

Adapter Device

On the one hand, present adapter device is useful for the mounting of mini-blades (1) or toothed blades, that are grouped in several units to produce the superficial roughing down of pneumatics, in particular to rough down the wheel tread and that said pneumatic remains in conditions to be retreaded.

On the other hand, present adaptater device is prepared to be mounted on rotary work structures (40) that usually have one set of mounting bodies (41)(42). This set includes a first and second bodies (41)(42) of mounting, among which the mini-blades (1) are mounted clamped by the clamping sets (20) of the adapter device. For the assemble of the rotary work structure (40), a plurality of bolts (43) that firmly bind the set (20)(40), are set.

Present device includes clamping sets (20) capable of clamping mini-blades (1) of the small size in a peripheral part of said sets (20). Each clamping set (20) includes a set of ending supports (21)(22) and, according to the operational necessities, it can use one or more intermediary separator support (23).

In general terms, all supports (21)(22)(23) will have a peripheral curved profile so that they can support the mini-blades (1) protruding with regards to the rotary work structure (40) and to equivalent radial distances.

More specifically, in each of the clamping sets (20), the sets of ending support (21)(22) include a first ending support (21) and a second ending support (22).

The first ending support (21) includes one or more transversal peripheral tabs (30), regarding the body from which they are projected, that work as one of the components of the jaws for the mini-blades (1). In an adjacent manner to the transversal peripheral tab (30), to the inside of the first ending support (21), there are guide members (31) that, in different embodiments, may consist, for example, in a plurality of ears, a plurality of tabs, a continuous tab, etc. These guide members (31), together with the transversal peripheral tab (30) form a peripheral socket that works as positional guide (32) in which the tabs (6) of the mini-blades (1) are fitted.

The second ending support (22) includes one or more transversal peripheral tabs (30) regarding the body from which they are projected, which work as another of the components of the jaws for the mini-blades (1).

In order to contribute to a better clamping effectiveness of the jaw, the possibility that the transversal peripheral tabs (30) may end in plane edges has been foreseen, in such a way that they make use of all the thickness of the body that comprises them.

The intermediary separator supports (23) include clamping transversal peripheral tabs (30) that are projected to opposite sides, in such a way that they are applied both to the front part [inner clamping portion (7)] and to the back part [external clamping portion (8)] of the mini-blades (1).

To such effect, it has been foreseen that the intermediary separator support (23) may consist of two or more parts united among themselves, for example: two component bodies (24)(25), a body with detachable, two bodies with detachable, solid parts, set of pressed sheets, shaped profiles, etc. In one of these embodiments, each of the component bodies (24)(25) of the intermediary separator support (23), has similar means than those of each ending support (21) (22), respectively.

In order to ensure the clamping of the mini-blades (1), the inclusion of some containment ending tops (35), that include the endings (9) of the mini-blade (1), has been foreseen.

The possibility of incorporating reliever means (10) in the transversal peripheral tabs (30) of the supports (21)(22)(23) that form the clamping jaws, has also been foreseen. These reliever means (10) may include a plurality of small openings that facilitate the aeration and prevent the accumulation of residues coming from the roughing down.

On the other side, all the supports (21)(22)(23) that form the clamping set (20) are equipped with positioning members (33) that determine the mounting position and the relative separation among said supports (21)(22)(23), within the mentioned clamping set (20). In the present embodiment, some of the supports have sets of positioning means (33), among which a mounting guide (34) is formed in which a positioning member (33) of the support is arranged in a confronted manner.

Finally, it has been foreseen that the different supports (21)(22)(23) may have openings for the different purposes. Some of these openings (37) are destined to allow the passage of the mounting bolts (43) that join the components (21)(22)(23) of the clamping set among themselves and with the rotary work structure (40). Other openings allow the reduction of weight and costs of the components, as well as avoid overheating.

The possibility that the transversal peripheral tabs (30), capable of being confronted, have different heights has also been foreseen. For example, the transversal peripheral tab (30) that clamps the external clamping portion (8) of the mini-blade (1) is a Little bit more higher than the transversal peripheral tab (30) that clamps the inner clamping portion (7). In this way, said external clamping portion (8) can be clamped above the fold or bend (5).

Operation

The different supports (21)(22)(23) that form the clamping sets (20) are arranged attached one to another, in train, with the mini-blades (1) interspersed in their jaws, in such a way that the toothed external edge (3) of these last ones protrudes from the clamping set (20).

In the assemble, the transversal peripheral tabs (30) of the confronted supports (21)(22)(23), compose the jaws in the middle of which the mini-blades are hold (1).

In the cases of the first ending support (21) and the first body (24) component of the intermediary separator support (23), the transversal tab (6) of the mini-blade (1) enters into the positional guide (32), which is defined by the peripheral socket formed by the transversal peripheral tab (30) and the guide members (31). Therefore, the edge of the transversal peripheral tab (30) clamps to the inner clamping portion (7) of the mini-blade (1).

Meanwhile, in those cases of the second ending support (22) and of the second body (23) component of the intermediary separator support (23), the edge of its transversal peripheral tab (30) clamps to the external clamping portion (8) of the mini-blade (1), in such a way that it forms a clamping jaw together with the transversal peripheral tab (30) of the adjacent support.

The transversal peripheral tabs (30) are complemented by the presence of the ending tops (35), which prevent the displacement of the mini-blades (1) in the same direction as the clamping jaws. In this manner an immovable positional fixing of the mini-blades (1) and a firm clamping of them in said transversal peripheral tabs (30) are obtained.

On the other side, several clamping sets (20) may be mounted over a same rotary work structure (40), to which mounting bodies (41)(42) they are related through bolts (43) that pass through both the mounting bodies (41)(42) and the supports (21)(22)(23). However, in no case shall they pass through the body (2) of the mini-blades (1) since their mounting is completely peripheral.

Even if one set of ending supports (21)(22) is enough to clamp a mini-blade (1), several intermediary separators (23) are usually used to assemble clamping sets (20) with several files of mini-blades (1) that give a suitable roughing down width, in relation to the width of the wheel tread to which the device is applied to.

On the other part, the use of the clamping sets (20) of different widths has been foreseen, in such a manner that one or more aligned mini-blades (1) may be included. Furthermore, this different width determines the amount of clamping sets (20) necessary to cover all the periphery of the rotary work structure (40).

Undoubtedly, upon putting the present invention into practice, modifications may be introduced regarding certain construction details and form, without leaving the essential principles that are clearly explained in the claims below:

The invention claimed is:

1. A peripheral clamping mini-blade, comprising:
a curved body having an inner side, an external side, a first edge, and a second edge, the first edge is opposite lengthwise to the second edge, the first edge has an L-shape with a bend projecting away from the inner side of the curved body from which a linear section projects;
toothed blades having curved edges located through the external side of the curved body;
a tab connected to the linear section of the first edge, the tab is placed transversal to the curved body, the tab runs from the first edge to the second edge of the curved body;
double toothed blades projecting away from the second edge of the body and the tab; and
openings located through the tab.

2. The peripheral clamping mini-blade according to claim 1, wherein the transversal tab is perpendicular to the body.

3. The peripheral clamping mini-blade according to claim 1, wherein the transversal tab and the body form an angle of 90° or less.

4. The peripheral clamping mini-blade according to claim 1, wherein the transversal tab is a continuous tab.

5. The peripheral clamping mini-blade according to claim 1, wherein the transversal tab extends throughout the inner edge.

6. The peripheral clamping mini-blade according to claim 1, wherein the transversal tab is adapted to be connected to a mounting adapter.

* * * * *